United States Patent
Hess et al.

(10) Patent No.: US 10,284,073 B2
(45) Date of Patent: May 7, 2019

(54) POWER SUPPLY BUILT-IN TESTING

(75) Inventors: Gary L. Hess, Enfield, CT (US); Kirk A. Lillestolen, East Hartland, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 635 days.

(21) Appl. No.: 13/455,600

(22) Filed: Apr. 25, 2012

(65) Prior Publication Data

US 2013/0289922 A1 Oct. 31, 2013

(51) Int. Cl.
*H02M 1/32* (2007.01)
*H02M 3/156* (2006.01)

(52) U.S. Cl.
CPC .............. *H02M 1/32* (2013.01); *H02M 3/156* (2013.01)

(58) Field of Classification Search
CPC ....................................................... G06F 1/26
See application file for complete search history.

(56) References Cited

U.S. PATENT DOCUMENTS

| | | | |
|---|---|---|---|
| 6,487,464 B1 * | 11/2002 | Martinez et al. ............... | 700/79 |
| 6,862,200 B2 * | 3/2005 | Sullivan et al. ................ | 363/65 |
| 6,895,515 B1 * | 5/2005 | Yamazaki ....................... | 713/300 |
| 7,596,706 B2 * | 9/2009 | Fuseya ........................... | 713/300 |
| 7,911,746 B2 * | 3/2011 | Zaretsky ................ | H02H 3/335 |
| | | | 327/439 |
| 2007/0226557 A1 | 9/2007 | Fuseya | |
| 2011/0194217 A1 | 8/2011 | Davis et al. | |
| 2012/0089368 A1 * | 4/2012 | Wang ....................... | G06F 11/24 |
| | | | 702/183 |
| 2012/0242380 A1 * | 9/2012 | Edwards ............ | G01R 31/3004 |
| | | | 327/143 |
| 2013/0067258 A1 * | 3/2013 | Furuya .................. | G06F 1/3203 |
| | | | 713/322 |

OTHER PUBLICATIONS

EP SR, Issued Nov. 28, 2016.

* cited by examiner

*Primary Examiner* — Paul D Lee
*Assistant Examiner* — Mark I Crohn
(74) *Attorney, Agent, or Firm* — Cantor Colburn LLP

(57) ABSTRACT

A disclosed system includes a switching power supply including a switching circuit and one or more monitoring circuits configured to monitor one or more power characteristics of the switching power supply, and a processing circuit configured to control the one or more monitoring circuits to perform a built-in test (BIT) of the one or more monitoring circuits.

17 Claims, 4 Drawing Sheets

POWER SUPPLY BUILT-IN TESTING

BACKGROUND OF THE INVENTION

The present disclosure relates to built-in testing (BIT) of monitoring circuits. In particular, the present disclosure relates to monitoring power characteristics of a power supply and performing BITs on the monitoring circuits of the power supply.

Switching power supplies convert power from an input power line to power of a different type or level on an output power line. Switching power supplies switch power on and off to a transformer to control a level of power supplied to the transformer and output from the transformer. Power supplies include shutdown circuits to detect input and output voltages and currents of the power supply, and to cause the power supply to reset or shut down when input or output voltages or currents are detected outside a predetermined range.

BRIEF DESCRIPTION OF THE INVENTION

Embodiments of the present disclosure include a power supply assembly comprising a switching power supply including a switching circuit and one or more monitoring circuits to monitor one or more power characteristics of the switching power supply, and a processing circuit configured to control the one or more monitoring circuits to perform a built-in test (BIT).

Embodiments of the present disclosure further include a processing circuit comprising main memory configured to store one or more instructions, and digital logic configured to execute the one or more instructions stored in main memory and to output control signals to one or more monitoring circuits of a switching power supply to perform a built-in test (BIT).

Embodiments of the present disclosure further include a method, comprising monitoring with a monitoring circuit a power characteristic of a power supply, performing a built-in test (BIT) of the monitoring circuit, and determining whether the BIT is successful based on a determination whether a reset of the power supply is detected.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
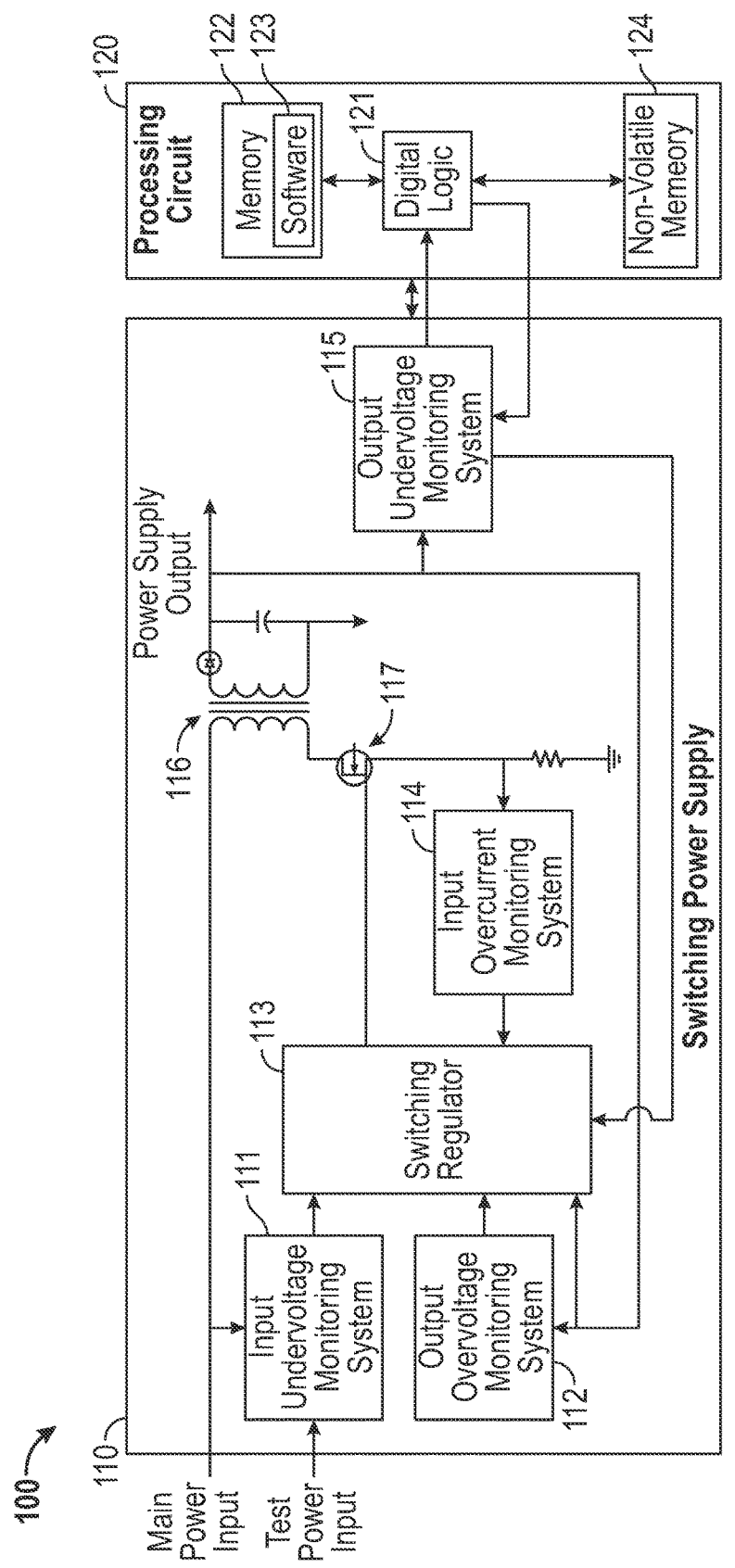
FIG. 1 illustrates a power supply built-in test system according to an embodiment of the present disclosure.

FIG. 1 illustrates a system 100 for performing a built-in test (BIT) of a switching power supply 110 according to one embodiment of the present disclosure. The system 100 includes a switching power supply 110 and a processing circuit 120. The switching power supply 110 includes a switching regulator 113 configured to control a switch 117, and a transformer 116 configured to transform a first input voltage to a second output voltage.

The system 100 may further include one or more monitoring circuits configured to detect an overvoltage, undervoltage, overcurrent or undercurrent and to shut down the switching power supply based on the detection. For example, the system 100 may include an input undervoltage monitoring circuit 111, an output overvoltage monitoring circuit 112, an input overcurrent monitoring circuit 114, an output undervoltage monitoring circuit 115, or any other type of monitoring circuit to monitor input and output voltages, currents, and power levels, and to shutdown the switching power supply 110 in response to a detected voltage, current, power level, or other characteristic that exceeds a predetermined threshold.

While FIG. 1 illustrates an input undervoltage monitoring circuit 111, an output overvoltage monitoring circuit 112, an input overcurrent monitoring circuit 114, and an output undervoltage monitoring circuit 115, embodiments of the present disclosure encompass any monitoring circuit configured to detect characteristics of an input power line, output power line, or intermediate power line, depending upon the design of the particular power supply having the monitoring circuits. In other words, embodiments of the present disclosure are not limited to the monitoring circuits illustrated in FIG. 1, which are provided for purposes of clarity in description.

The monitoring circuits monitor conditions of the power lines of the switching power supply 110 and control functions of the switching power supply 110 based on the results of the monitoring. FIG. 1 illustrates a power supply output undervoltage monitor circuit 115 configured to monitor an output voltage of the switching power supply 110 and to cause the switching power supply 110 to reset based on the detection of an output undervoltage.

The system 100 may further include a processing circuit 120 to perform built-in tests (BITs) of one or more of the monitoring circuits, including the input undervoltage monitoring circuit 111, the output overvoltage monitoring circuit 112, the input overcurrent monitoring circuit 114, and the output undervoltage monitoring circuit 115. In particular, the processing circuit 120 includes digital logic 121, memory 122, which may be volatile memory, non-volatile memory, or a combination of each, and non-volatile memory 124. The processing circuit 120 is configured to output one or more control signals to the monitoring circuits to initiate a BIT, to detect results of the BIT, and to perform predetermined actions based on the results of the BIT. For example, the processing circuit 120 may be configured to receive BIT information from the monitoring circuits and to output control signals to the monitoring circuits to change triggering thresholds of the monitoring circuits, or configured to output control signals to a main power input to adjust voltage, current, or power to the monitoring circuits.

In one embodiment, when the processing circuit 120 determines that a BIT is to be performed, the processing circuit 120 may output control signals to the monitoring circuits to change a threshold voltage, current, or power level of the monitoring circuits to trigger a reset operation. Alternatively, the processing circuit 120 may adjust a main power input to the monitoring circuits to trigger a reset. In yet another embodiment, the processing circuit 120 may control the monitoring circuits to monitor a test power input line having a power characteristic that is predetermined to trigger a reset condition of the switching power supply 110.

The memory 122 is used to store software 123 to control the BIT operation and one or more additional power-up operations. The memory 122 may be volatile memory, such as RAM, or non-volatile memory, such as EEPROM, FLASH, or NOV-RAM, or any combination of volatile and non-volatile memory. In addition, the processing circuit 120 may include non-volatile memory 124 configured to store one or more voltage, current, or power threshold values, and any other initialization or power-up data or instructions, such that the threshold values and instructions remain stored in the non-volatile memory when the switching power supply 110 is reset and power is cut off to the processing circuit 120. Accordingly, even after a reset condition occurs and power is cut off to the processing circuit 120, the threshold values are stored in the non-volatile memory 124 and may be restored to the monitoring circuits once power has been restored to the processing circuit 120.

In one embodiment, the threshold values may be stored in the memory 122 or non-volatile memory 124. In another embodiment, the threshold values may be provided by one or more physical circuits, including circuits lacking software components, such as voltage divider circuits. In such an embodiment, a threshold voltage may be changed by switching a switch to alternatingly connect a monitored power line to voltage dividers having different resistances, and thus different output voltages. In such an embodiment, the threshold voltages or currents may not be stored in memory 122 or non-volatile memory 124, rather a state of a threshold voltage selection switch may be stored in memory 122 or non-volatile memory 124. For example, in an embodiment in which a first state of the switch connects a monitored line to a first voltage divider corresponding to a normal operation, and a second state of the switch connects the monitored line to a second voltage divider corresponding to a changed threshold value, a flag or value corresponding to the first state of the switch may be stored in non-volatile memory 124. Consequently, at power-up after a reset, the power supply 110 may operate based on the normal operation threshold values.

While FIG. 1 illustrates a processing circuit 120 including memory 122 which may store software configured to store the threshold values and change threshold values of the monitoring circuits, embodiments of the present disclosure encompass other digital circuits capable of controlling the threshold values of the monitoring circuits and detecting reset states, such as a hardware state machine.

In operation, the digital logic 121 of the processing circuit 120 executes one or more instructions from software 123 to initiate a BIT test of one or more monitoring circuits, such as monitoring circuits 111, 112, 114, and 115 illustrated in FIG. 1. The initiation of the BIT test may be as a result of detection of a predetermined condition, such as a regularly scheduled BIT, a command from an external device or user, or a detected condition, such as a detected reset of the switching power supply 110. The processing circuit 120 may perform the BIT and may store or output results of the BIT, or may control an operation of the switching power supply 110 based on the results of the BIT. For example, in one embodiment, the processing circuit 120 stores or outputs a notification message or signal indicating whether the BIT was successful. Accordingly, a system or user may be notified whether one or more monitoring circuits are functioning properly. In another embodiment, the processing circuit 120 may shut down the switching power supply 110 based on a failure of one or more BITs.

Figure 2:
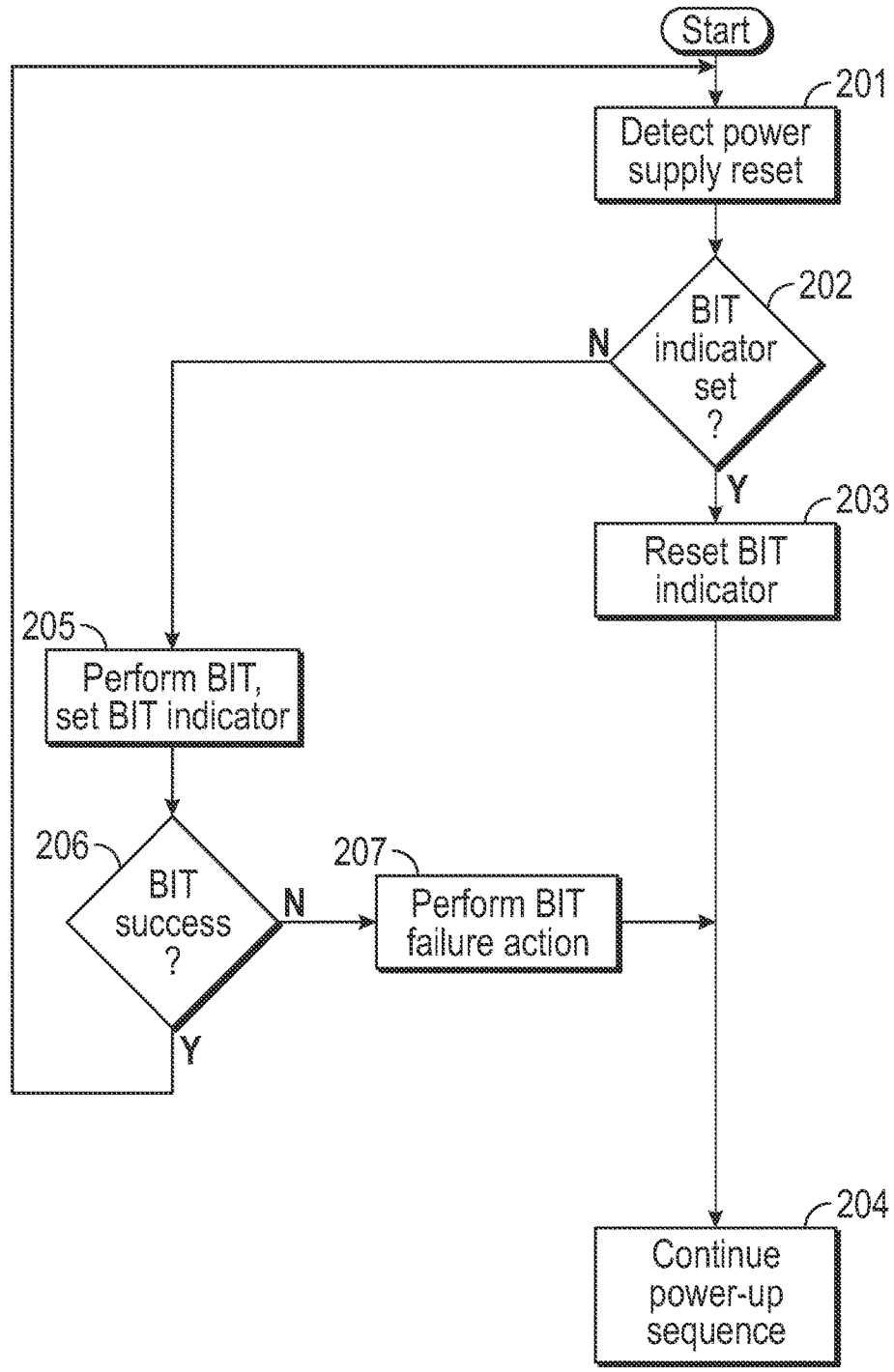
FIG. 2 is a flowchart illustrating a method of performing a built-in test according to one embodiment of the disclosure.

FIG. 2 is a flowchart illustrating a process according to one embodiment of the present disclosure. In operation 201, a reset is detected. For example, processing circuit 120 may detect that power was cut off to the processing circuit 120 indicating a reset condition of one or both of the switching power supply and the processing circuit 120 by detecting one or more values stored in memory 122 or omitted from memory 122. In operation 202, it is determined whether the built-in test (BIT) indicator is set, indicating that the reset was a result of a BIT. For example, the BIT indicator may be a value stored in one of memory 122, the digital logic 121, or the non-volatile memory 124, and the processing circuit 120 may detect the presence or absence of the BIT indicator.

If it is determined in operation 202 that the BIT indicator is set, indicating that the reset was a result of a BIT, then the BIT indicator is reset in operation 203, and the power-up sequence is continued in operation 204. In addition, a notification may be provided to a control system, to another device, or to a user that the BIT was successful.

In one embodiment, the power-up sequence of the processing circuit 120 may include detecting the BIT indicator, setting or adjusting input voltage values of the switching power supply 110, switching rates of the switching regulator 113 to control the switch 117, and setting, adjusting, or checking threshold values of the monitoring circuits of the switching power supply 110. The input voltage, switching rates, and monitoring circuit thresholds may be adjusted or set to supply the power from the switching power supply 110 according to the predetermined specifications of the switching power supply 110. In other words, the monitoring circuit thresholds may be set such that the switching power supply 110 operates in a normal, as opposed to a built-in-testing, state.

If it is determined in operation 202 that the BIT indicator is not set, indicating that the reset was not as a result of a BIT, then a BIT may be performed in operation 205 and the BIT indicator is set. In operation 206, it is determined whether the BIT is successful. If the BIT is successful and a reset occurs, then the power supply reset is detected in operation 201. Otherwise, the power-up sequence continues in operation 204. When it is determined that the BIT is unsuccessful, the processing circuit 120 may perform one or more failure actions in operation 207 prior to continuing the power-up sequence. For example, the processing circuit 120 may store or output a BIT failure notification signal or message.

Figure 3:
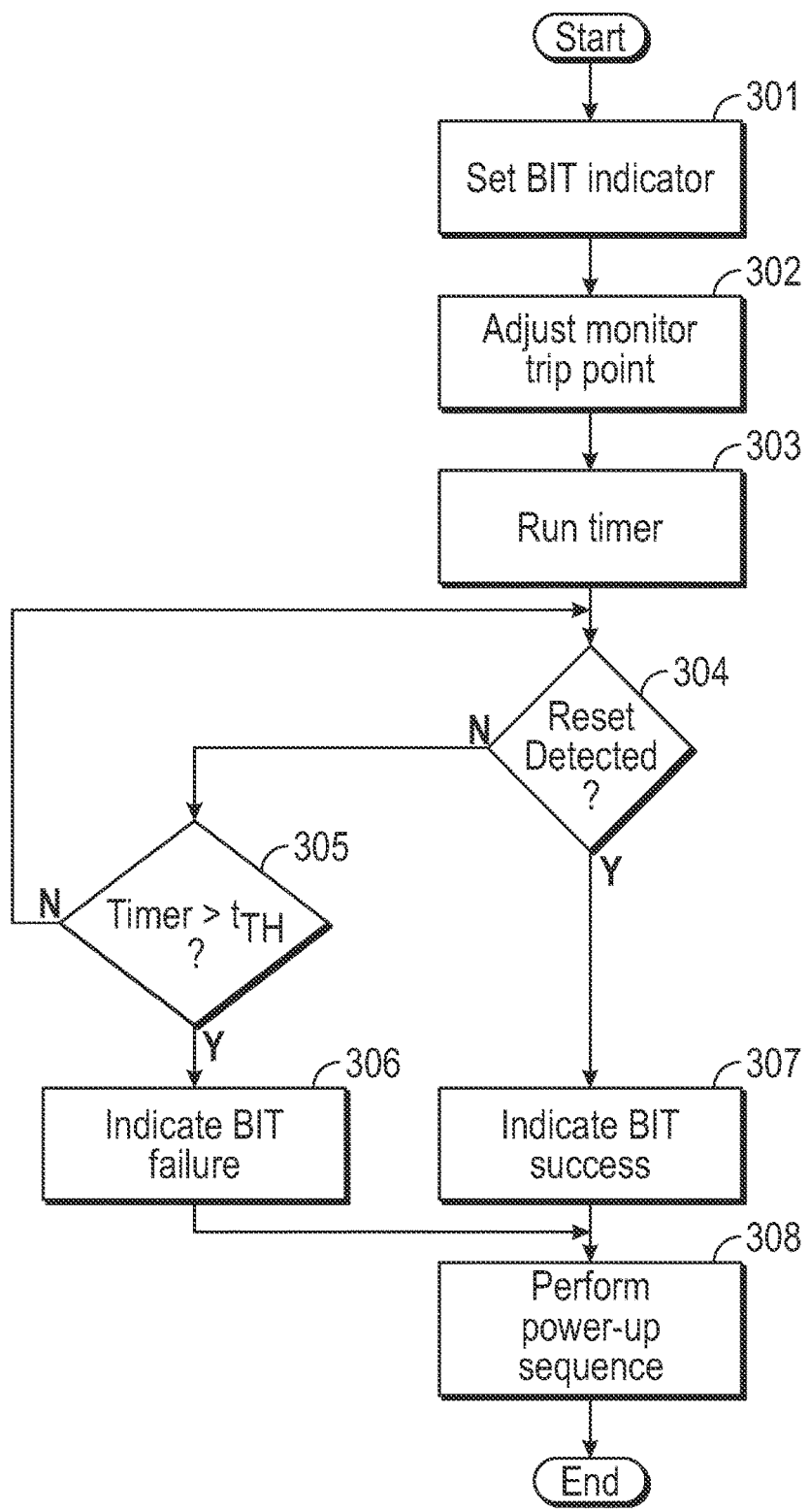
FIG. 3 is a flowchart illustrating a method of performing a built-in test according to another embodiment of the disclosure.

FIG. 3 further describes a process of performing a BIT test in additional detail. The BIT test of FIG. 3 may correspond, for example, to the BIT test described in operation 205 of FIG. 2. In operation 301, a BIT indicator is set. For example, the BIT indicator may include one or more bits in memory 122, digital logic 121, or non-volatile memory 124 of the processing circuit 120.

In operation 302, a circuit monitor trip point is adjusted. For example, the digital logic 121 of the processing circuit 120 may execute software 123 from memory 122 to output control signals to one or more of the input overvoltage monitor 111, the output overvoltage monitor 112, the input overcurrent monitor 114, or the power supply output undervoltage monitor 115. In one embodiment, adjusting a monitor trip point includes decreasing a trip point of an overvoltage or overcurrent monitor. In another embodiment, adjusting the monitor trip point includes increasing a trip point of an undervoltage or undercurrent monitor. In other words, the trip points are adjusted to a level such that the expected input voltage or current will trip the monitoring circuit, resulting in a reset condition of the switching power supply 110.

In operation 303, a timer is started. For example, the processing circuit 120 may include a timer circuit executed by software 123, by digital logic 121, or by a combination of digital logic 121 executing the software 123. In operation 304, it is determined whether a reset is detected. The reset may include one or both of a switching power supply 110 reset and a processing circuit 120 reset. If the reset is not detected, then it is determined in operation 305 whether the timer value, timer, is greater than a threshold value $t_{TH}$. If not, then the switching power supply 110 is further monitored to determine whether the reset occurs. If the timer value, timer, is greater than the threshold value $t_{TH}$, then it is determined in operation 306 that a BIT failure has occurred. In other words, since a reset has not occurred even though the processing circuit 120 modified the monitoring threshold values to trigger a reset condition, it is determined that the modified monitoring circuit has failed the BIT. Once it is determined in operation 306 that a BIT failure has occurred, a notification may be generated to indicate to a system or user that a monitoring circuit is not operational, one or more notification bits may be set, the switching power supply 110 may be shut down, or any other action may be taken as a result of determining that a BIT failure occurred.

On the other hand, if in operation 304 it is determined that the reset has occurred, then in operation 307 it is determined that the BIT was a success, and the power-up sequence is performed in operation 308.

Figure 4:
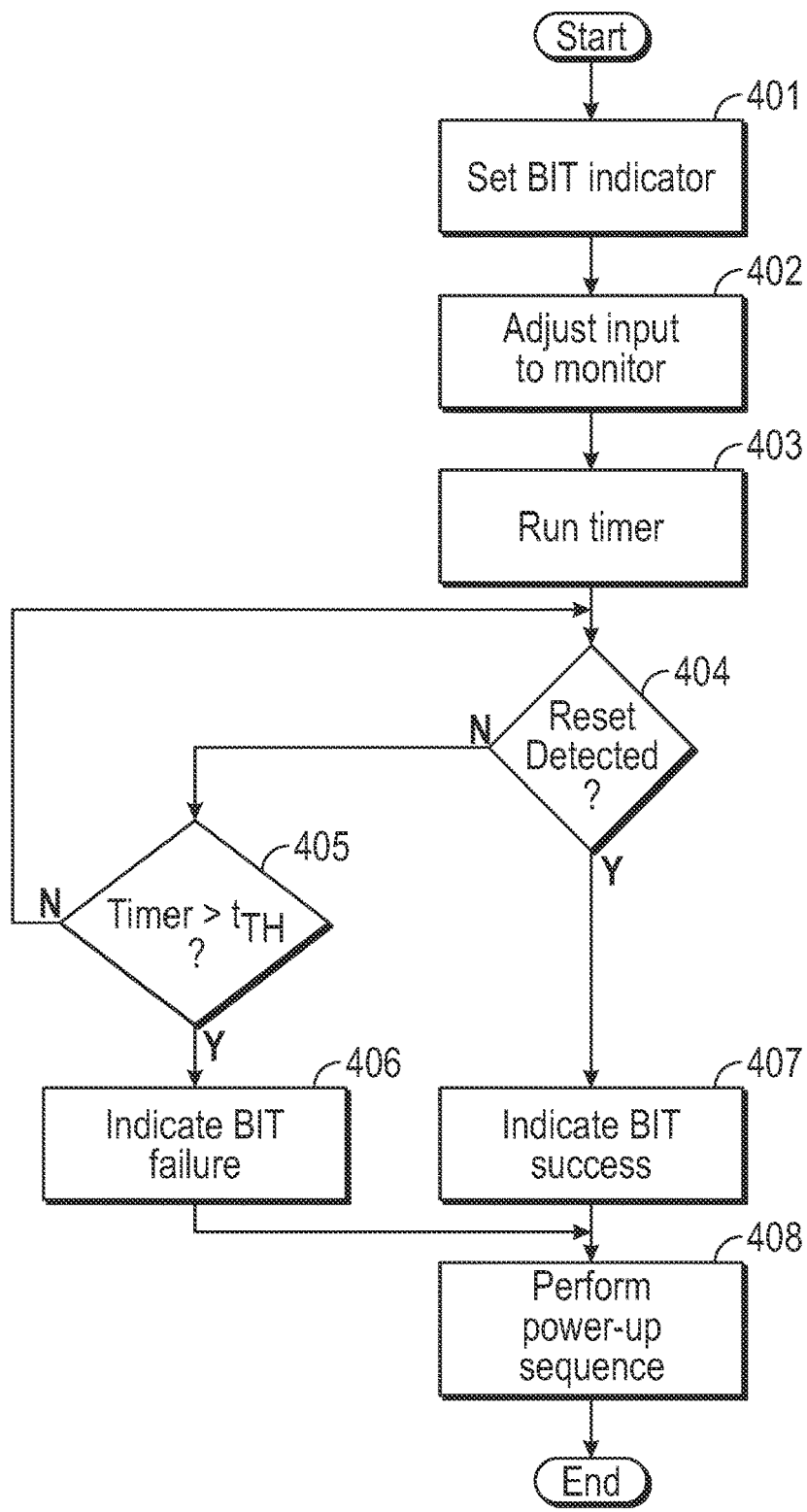
FIG. 4 is a flowchart illustrating a method of performing a built-in test according to yet another embodiment of the disclosure.

FIG. 4 illustrates a process of performing a BIT test, such as in operation 205 of FIG. 2, according to another embodiment of the present disclosure. In operation 401, a BIT indicator is set. For example, the BIT indicator may include one or more bits in memory 122, digital logic 121, or non-volatile memory 124 of the processing circuit 120.

In operation 402, an input power, voltage, or current is adjusted to one or more monitor circuits. For example, the digital logic 121 of the processing circuit 120 may execute software 123 from memory 122 to output control signals to one or more power input devices or circuits. In one embodiment, an input voltage is increased to an overvoltage monitor, or an input voltage is decreased to an undervoltage monitor. According to another embodiment, an input current is increased to an overcurrent monitor or an input current is decreased to an undercurrent monitor.

In one embodiment, the processing circuit 120 adjusts power levels of the main power input to the switching power supply 110. In another embodiment, the monitoring circuits may include a main power input corresponding to the power input of the switching power supply 110 and a test power input to receive power from a test power supply controlled by the processing circuit 120. The processing circuit 120 may control the test power input levels, and may provide control signals to the monitoring circuits to operate based on the test power input levels rather than the main power input during the BIT.

In operation 403, a timer is started. For example, the processing circuit 120 may include a timer circuit executed by software 123, by digital logic 121, or by a combination of digital logic 121 executing the software 123. In operation 404, it is determined whether a reset is detected. If the reset is not detected, then it is determined in operation 405 whether the timer value, timer, is greater than a threshold value $t_{TH}$. If not, then the switching power supply 110 is monitored to determine whether the reset occurs. If the timer value, timer, is greater than the threshold value $t_{TH}$, then it is determined in operation 406 that a BIT failure has occurred. For example, a notification may be generated to indicate to a system or user that a monitoring circuit is not operational, one or more notification bits may be set, or any other action may be taken as a result of determining that a BIT failure occurred.

On the other hand, if in operation 404 it is determined that the reset has occurred, then in operation 407 it is determined that the BIT was a success, and the power-up sequence is performed in operation 408.

According to embodiments of the present disclosure, a power supply circuit is provided with one or more monitoring circuits to monitor power characteristics of an input power line and an output power line. The monitoring circuits may be configured to trigger a reset of the power supply circuit when the detected characteristics exceed predetermined threshold values. In addition, the power supply circuit may be provided with a processing circuit to provide a built-in-test (BIT) to the one or more monitoring circuits. The BIT of the monitoring circuits may include adjusting threshold values of the monitoring circuits to trigger a reset, or adjusting power levels input to the monitoring circuits to trigger the reset. The processing circuit may then determine whether the BIT was successful and may perform one or more actions based on the determination that the BIT was a success.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system, comprising:
 a switching power supply including a switching circuit and one or more monitoring circuits configured to monitor one or more power characteristics of the switching power supply;
 a processing circuit configured to control the one or more monitoring circuits to perform a built-in test (BIT) of the one or more monitoring circuits, wherein the processing circuit is configured to perform the BIT by executing a timer with a timer value, determining whether the timer value has exceeded a time threshold value prior to initially detecting a reset condition of the power supply, and indicating that a BIT failure occurred based on a determination that the timer value has exceeded the time threshold value; and
 a non-volatile memory configured to store BIT test threshold values of the one or more monitoring circuits, wherein the BIT test threshold values include at least one of a voltage threshold value, a current threshold value, and a power threshold value, wherein the non-volatile memory is configured to restore the BIT test threshold values to the one or more monitoring circuits, and the processing circuit is configured to adjust a power level input to the one or more monitoring circuits to a level that exceeds the threshold value of the one or more monitoring circuits to trigger a reset of the switching power supply and the processing circuit, wherein power is cutoff to the processing circuit via the reset of the switching power supply, wherein the processing circuit is configured to adjust the threshold values of the one or more monitoring circuits corresponding to a value at which the monitoring circuit triggers the reset.

2. The system of claim 1, wherein the processing circuit is configured to detect the reset condition, determine whether a BIT indicator is set, perform the BIT of the one or more monitoring circuits based on a determination that the BIT indicator is not set, perform the BIT by setting the bit indicator, and perform at least one of storing a BIT failure notification and outputting a BIT failure notification based on the determination that the BIT failure occurred.

3. The system of claim 1, wherein the one or more monitoring circuits includes at least one of an overvoltage monitoring circuit, and undervoltage monitoring circuit, and an overcurrent monitoring circuit.

4. The system of claim 1, wherein the switching power supply includes a switch and a switching regulator to control a switching operation of the switch, and
the one or more monitoring circuits are configured to output a reset control signal to the switching regulator based on a detection of a predetermined characteristic of a power line.

5. A processing circuit, comprising:
main memory configured to store one or more instructions;
digital logic configured to execute the one or more instructions stored in main memory and to output control signals to one or more monitoring circuits of a switching power supply to perform a built-in test (BIT) of the one or more monitoring circuits, wherein performing the BIT includes executing a timer with a timer value, determining whether the timer value has exceeded a time threshold value prior to initially detecting a reset condition of the switching power supply and determining whether the timer value has exceeded the time threshold value prior to a next reset, and indicating that a BIT failure occurred based on a determination that the timer value has exceeded the time threshold value; and
a non-volatile memory configured to store BIT test threshold values of the one or more monitoring circuits, wherein the BIT test threshold values include at least one of a voltage threshold value, a current threshold value, and a power threshold value, wherein the non-volatile memory is configured to restore the BIT test threshold values to the one or more monitoring circuits, and the control signals include signals to adjust the threshold value of a monitored input characteristic of the one or more monitoring circuits to a level predetermined to result in the reset condition of the switching power supply and the processing circuit, wherein power is cutoff to the processing circuit via the reset condition of the switching power supply.

6. The processing circuit of claim 5, wherein the control signals include signals to adjust a monitored power characteristic to the one or more monitoring circuits to a level predetermined to result in the reset condition.

7. The processing circuit of claim 5, wherein performing the BIT includes outputting the control signals to the one or more monitoring circuits, the control signals corresponding to the reset condition, and setting a BIT indicator.

8. The processing circuit of claim 7, wherein indicating that the BIT failed includes at least one of storing a BIT failure notification and outputting a BIT failure notification.

9. A method, comprising:
monitoring with a monitoring circuit a power characteristic of a power supply;
performing a built-in test (BIT) of the monitoring circuit, wherein a non-volatile memory is configured to store BIT test threshold values of the monitoring circuit, wherein the BIT test threshold values include at least one of a voltage threshold value, a current threshold value, and a power threshold value, wherein the non-volatile memory is configured to restore the BIT test threshold values to the one or more monitoring circuit, wherein performing the BIT includes adjusting the threshold of the monitoring circuit corresponding to a reset condition of the power supply, adjusting the power characteristic input to the monitoring circuit to a level corresponding to the reset condition of the power supply, executing a timer with a timer value, determining whether the timer value has exceeded a time threshold value prior to initially detecting the reset condition of the power supply and determining whether the timer value has exceeded the time threshold value prior to a next reset, and determining that the BIT failed based on a determination that the timer value has exceeded the time threshold value; and
determining whether the BIT is successful based on a determination whether a reset of the power supply and the processing circuit, wherein power is cutoff to the processing circuit via the reset of the power supply, is detected.

10. The method of claim 9, wherein monitoring the power characteristic of the power supply includes monitoring at least one of an overvoltage, an undervoltage, an overcurrent, and an undercurrent of the power supply.

11. The method of claim 9, wherein performing the BIT further comprises:
setting a BIT indicator.

12. The method of claim 11, further comprising performing at least one of storing a BIT failure notification and outputting a BIT failure notification based on the determination that the BIT failed.

13. The method of claim 9, wherein adjusting the threshold of the monitoring circuit comprises decreasing a trip point of an overvoltage monitor and adjusting the power characteristic input to the monitoring circuit comprises increasing a voltage to the overvoltage monitor to reset the power supply.

14. The method of claim 9, wherein adjusting the threshold of the monitoring circuit corresponding to the reset condition of the power supply comprises decreasing a trip point of an overcurrent monitor and adjusting the power characteristic input to the monitoring circuit comprises increasing a current to the overcurrent monitor to reset the power supply.

15. The method of claim 9, wherein adjusting the threshold of the monitoring circuit corresponding to the reset condition of the power supply comprises increasing a trip point of an undervoltage monitor and adjusting the power characteristic input to the monitoring circuit comprises decreasing a current to the undervoltage monitor to reset the power supply.

16. The method of claim 9, wherein adjusting the threshold of the monitoring circuit corresponding to the reset condition of the power supply comprises increasing a trip point of an undercurrent monitor.

17. The method of claim 16, wherein adjusting the power characteristic input to the monitoring circuit comprises decreasing a current to the undercurrent monitor to reset the power supply.

\* \* \* \* \*